US008776051B2

(12) United States Patent
Park et al.

(10) Patent No.: US 8,776,051 B2
(45) Date of Patent: Jul. 8, 2014

(54) METHOD OF PROVIDING PARTIALLY ISOLATED EXECUTION ENVIRONMENT FOR MULTIPLE APPLICATIONS AND DIGITAL INFORMATION APPARATUS USING THE SAME

(75) Inventors: Chong-mok Park, Seoul (KR); Seung-bum Chung, Seongnam-si (KR); Ho-bum Kwon, Suwon-si (KR); Un-gyo Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2032 days.

(21) Appl. No.: 11/701,393

(22) Filed: Feb. 2, 2007

(65) Prior Publication Data
US 2007/0226719 A1 Sep. 27, 2007

(30) Foreign Application Priority Data

Feb. 23, 2006 (KR) .................. 10-2006-0017762

(51) Int. Cl.
*G06F 9/455* (2006.01)
(52) U.S. Cl.
USPC ............................................................ 718/1
(58) Field of Classification Search
None
See application file for complete search history.

(56) References Cited

U.S. PATENT DOCUMENTS

| | | | |
|---|---|---|---|
| 6,606,742 B1 * | 8/2003 | Orton et al. ................... 717/140 |
| 6,931,544 B1 | 8/2005 | Kienhofer et al. |
| 7,024,668 B2 * | 4/2006 | Shiomi et al. .................... 718/1 |
| 7,263,700 B1 * | 8/2007 | Bacon et al. ...................... 718/1 |
| 7,325,233 B2 * | 1/2008 | Kuck et al. ..................... 718/103 |
| 2003/0115245 A1 | 6/2003 | Fujisawa |

FOREIGN PATENT DOCUMENTS

| | | |
|---|---|---|
| GB | 2365554 A | 2/2002 |
| JP | 2000-181727 A | 6/2000 |
| JP | 2003-186683 A | 4/2003 |
| JP | 2004-78617 A | 3/2004 |
| JP | 2004-102398 A | 4/2004 |
| KR | 10-2001-0006997 A | 1/2001 |
| KR | 10-2002-0078749 A | 10/2002 |
| KR | 10-2005-0063304 A | 6/2005 |
| WO | 01/63412 A2 | 8/2001 |

OTHER PUBLICATIONS

Godmar Back, "Isolation, Resource Management and Sharing in the Kaffeos Java Runtime System", A dissertation submitted to the faculty of the university of Utah in partial fulfillment of the requirements for the degree of Doctor of Philosophy in Computer Science, May 2002, pp. 1-175.
Grzegorz Czajkowski, "Application Isolation in the Java™ Virtual Machine", ACM Sigplan Notices, Oct. 15, 2001, pp. 354-366, vol. 35 No. 10, Association for Computing Machinery, New York, NY, US.

(Continued)

Primary Examiner — Gregory A Kessler
(74) Attorney, Agent, or Firm — Sughrue Mion, PLLC

(57) ABSTRACT

A method of providing a partially isolated execution environment for multiple applications in a digital information apparatus having a virtual machine and middleware is provided. The method includes initializing an application manager by driving the virtual machine, and loading and initializing a main class of the middleware, executing an action for each application through a method of the application manager while executing a main method of the main class of the middleware, and finalizing all threads and ending a process during execution in the virtual machine.

15 Claims, 10 Drawing Sheets

(56) References Cited

OTHER PUBLICATIONS

Sunto, H., et al., "Design of an Embedded JavaVM with an Object-oriented Approach", Feb. 2003, pp. 139-146, Japan.

Sato, M., et al., "Process Management of the Operating System "Future" for on Chip Multithreaded Architecture", Mar. 2004, pp. 38-49, vol. 45, No. SIG 3, Japan.

"Real-Time Mach", Jan. 2006, pp. 24-44, vol. 23, No. 1, Japan.

* cited by examiner

METHOD OF PROVIDING PARTIALLY ISOLATED EXECUTION ENVIRONMENT FOR MULTIPLE APPLICATIONS AND DIGITAL INFORMATION APPARATUS USING THE SAME

CROSS REFERENCE TO RELATED APPLICATION

This application claims priority from Korean Patent Application No. 10-2006-0017762 filed on Feb. 23, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to a virtual machine, and more particularly, to providing a partially-isolated execution environment for multiple applications that allows multiple applications to be stably executed in a virtual machine to be executed by a single operating system (OS) process, and to a digital information apparatus using the same.

2. Description of the Related Art

In general, a virtual machine to be executed in a single OS process (for example, middleware) is loaded in an environment where only one application can be executed. Then, when multiple applications are executed under this environment, a structure that allows Java objects and resources of the OS to be shared among all applications needs to be provided. Accordingly, if the shared Java object is corrected by one application, other applications may be affected by the correction. In a related art virtual machine, a basic isolation function is provided such that static fields included in classes loaded by different class loaders are separately managed, not shared. However, an isolated execution environment for a group of threads is not provided.

A method of providing an isolated execution application is broadly divided into two methods: a method of executing each application in one OS process; and a method of executing multiple applications in one OS process under an isolated environment. The invention refers to the second method, and relates to a technology of providing partial isolation to partially allow sharing of objects.

A virtual machine provides a standard application execution environment that ensures mobility of an application to be executed in any digital information apparatus. FIG. 1 is a diagram showing the configuration of a digital information apparatus including a virtual machine according to the related art.

Referring to FIG. 1, a digital information apparatus 100 includes a Central Processing Unit (CPU) 10, a memory in which a virtual machine 20, middleware 30, and downloaded application 40 reside, a display processor 50, an external apparatus communication unit (peripherals) 60, and a bus 70. The external apparatus communication unit 60 may include a Universal Serial Bus (USB) connection device, a serial connection device, an infrared (IR) connection device, a flash memory, an Ethernet communication device, a hard disk, and the like. The Ethernet communication may be implemented by various shapes, for example, a wired packet communication network, such as Local Area Network (LAN) or Wide Area Network (WAN) through Asymmetric Digital Subscriber Line (ADSL)/cable modem, wireless/mobile communication network, such as wireless LAN, Code Division Multiple Access (CDMA)/Global System for Mobile Communications (GSM)/General Packet Radio Services (GPRS), or wired/wireless broadcast network, such as digital TV public/cable/satellite. In case of satellite broadcast or public broadcast, the digital information apparatus 100 may be connected to LAN or ADSL through IEEE 1394 or an Ethernet interface. In case of cable broadcast, since bidirectional communication support is executed through a cable modem, bidirectional communication can be supported without using a separate Ethernet interface. Further, for a Personal Video Recorder (PVR) function, a hard disk using an interface, such as Enhanced Integrated Device Electronics (EIDE), may be included.

In case of a virtual machine 20 that is mounted on the digital information apparatus 100 connected to a network, virtual machine applications are usually downloaded from the outside and then executed. In the memory, the downloaded applications 40, and the middleware 30 for managing a life cycle, such as the start and end of the application, reside. The middleware 30 and the downloaded applications 40 are executed on the virtual machine 20. For example, in case of an information apparatus, such as a digital TV (DTV) or a digital set-top box having a data broadcast receiving function, a Java virtual machine is mounted, and DTV middleware (based on a standard specification, such as OpenCable Application Platform (OCAP)/Advanced Common Application Platform (ACAP)/Multimedia Home Platform (MHP)) for controlling DTV apparatuses and managing downloaded Java applications exists thereon. The Java applications to be executed in such an information apparatus are created based on the Java specification called Xlet and are downloaded through a broadcast or a network.

Meanwhile, the virtual machine applications are formed in terms of classes. One application may include multiple classes. In each class, methods including execution codes are included. Each method has execution commands expressed as byte codes. There are various kinds of virtual machines. Among these, virtual machines, such as "Common Language Runtime (CLR)" introduced by Java and Microsoft and "Smalltalk", are representative. For convenience of explanation, in the invention, the description will be given by way of the Java virtual machine. However, the scope of the invention is not limited to a specified virtual machine.

FIG. 2 is a diagram showing the configuration of the Java virtual machine according to the related art. Referring to FIG. 2, the Java virtual machine 20 has a class library 21 and a run-time system.

The class library 21 is a set of common classes to be executed on the run-time system, and means a set of classes that are formed in advance to be used in the application.

The run-time system provides the overall execution environment that can execute virtual machine codes. The run-time system internally includes an interpreter 23, a JIT compiler 22, a class loader 24, a garbage collector 26, and a thread manager 25.

The JIT compiler 22 converts virtual machine commands into a machine language of the CPU during execution of classes. In general, a Just-In-Time (JIT) compiler is used. The interpreter 23 executes the execution codes of the classes. That is, the interpreter 23 recognizes the virtual machine commands and executes the commands. The class loader 24 loads the classes. The thread manager 25 manages threads as an execution unit. Specifically, the thread manager 25 collectively manages multiple threads to be simultaneously executed in order to process different codes. The garbage collector 26 manages memory spaces of objects and collects objects unused such that the memory spaces are reused.

FIG. 3 is a diagram showing the correlation of thread groups and threads in the Java virtual machine shown in FIG. 2. In case of the Java virtual machine 20, thread groups for grouping associated threads exist. In this case, each thread belongs to one thread group. The thread group belongs to another thread group. When the Java virtual machine 20 is executed, a main thread group and a finalizer thread exist below a system thread group, and a main thread exist in the main thread group. The main thread executes a "main" method transferred to a parameter when the virtual machine is driven, and the finalizer thread executes a required cleanup job before the objects are collected.

FIG. 4 is a diagram showing a flow of an execution process of the Java virtual machine according to the related art. Generally, one Java virtual machine is driven by one OS process. A description will be given for FIG. 4 on the above-described condition.

When the Java virtual machine 20 is driven, basic global data structures are initialized, and then the class loader 24 is initialized (operation S10). Next, a system thread group and a finalizer thread belonging to the system thread group are generated, and a main thread group and a main thread belonging to the main thread group are generated (operation S20). At this time, the generated finalizer thread and main thread are registered in a thread manager to be then managed (operation S30). Next, the main class is loaded and initialized (operation S40). Here, a method of loading a main class is assigned by a parameter when the virtual machine is driven. If the main class is loaded, a main method is executed. In the digital information apparatus 100 shown in FIG. 1, a class including start codes of the middleware 30 residing in the memory corresponds to the main class. From the main method defined in the main class, the middleware 30 starts to be driven (operation S50). If the main method ends, operation of ending the virtual machine is executed. At the ending operations, all threads that are being currently executed (threads that are being managed by the thread manager 25) end. Then, the process that is being executed by the virtual machine ends (operation S60).

An execution process of the middleware 30 will be described in detail with reference to FIG. 5. FIG. 5 is a diagram showing a flow of an execution process of the middleware according to the related art. When the middleware 30 starts, the basic data structures are initialized (operation S51), and it is judged which action is to be executed in order to execute the application (operation S52). If a new application needs to be loaded or generated, the class of the application is loaded, and then the objects of the application class are generated (operation S53). When the start of the application is required, a new thread is generated, and the application code is driven by calling the start method of the object (operation S54). Further, when the stop of the application during the execution is required, a stop method for stopping the application is called, and it waits until the application ends (operation S55). If other actions are required, other actions are executed (operation S56). Various actions described above may be repeatedly executed. Then, it is judged whether or not another action is to be executed (operation S57). When another action is to be executed, the process returns to operation S52 and the above-described operations are repeatedly executed. Through the above-described process, it is possible to provide an environment where multiple different applications are simultaneously executed.

However, the above-described related art virtual machine cannot control resources to be shared while multiple applications are executed, and thus stability of the virtual machine may be threatened. Since the virtual machine is executed by one OS process, multiple applications are executed by multiple threads in the same process. The method of ending the application is based on an assumption that the thread executing the application by calling the end method cleans up all threads generated during the execution and all resources used. However, when the application does not actually execute this process, the threads by the application and the resources are not cleaned up. When the state where the resources are not cleaned up is continued, the virtual machine may not operate any more due to lack of the resources.

In order to solve these problems, there is suggested a method that completely isolates different applications as if one application is executed in one OS process. In this case, however, there is a problem in that different applications cannot share any objects. Accordingly, all codes of the middleware for managing applications on the virtual machine are coded again in consideration of a situation where the objects are not shared, an inefficient method, such as Remote method invocation (RMI) or the like, needs to be used when sharing of the objects are required. Therefore, there is a problem in that the middleware depending on the related art virtual machine changes an object management method according to a new method.

Further, there is suggested a method of managing applications like the OS process while allowing sharing of a part of the objects. In this case, however, a special function needs to be used in order to share the objects, and thus a virtual machine different from the standard Java specification needs to be implemented. Further, the application and middleware need to be implemented according to a virtual machine different from the standard.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a partially-isolated execution environment for multiple applications that can efficiently process an end of threads according to an execution and an end of the application in a virtual machine on which multiple applications are executed and can efficiently process a cleanup of resources to be shared, and a digital information apparatus using the same.

According to an aspect of the invention, there is provided a method of providing a partially-isolated execution environment for multiple applications in a digital information apparatus having a virtual machine and middleware, the method including initializing an application manager by driving the virtual machine, and loading and initializing a main class of the middleware, executing an action for each application through a method of the application manager while executing a main method of the main class of the middleware, and finalizing all threads and ending a process during execution in the virtual machine.

The initializing of the application manager and the initializing and loading of the main class may include initializing the application manager by generating a representative application object with the virtual machine as one system application, generating a system thread group for a system, a main thread group and a finalizer thread constituting the system thread group, and a main thread constituting the main thread group, registering the finalizer thread and the main thread in a per-application thread manager; and loading and initializing the main class of the middleware.

The executing of the action may include causing the middleware to load a new application, generating a thread structure by the loaded application through a start method of the application manager, and ending the thread structure by the application through a halt method of the application manager. These may be repeatedly performed.

According to another aspect of the invention, there is provided a digital information apparatus on which a virtual machine is mounted, the apparatus including an interpreter which analyzes virtual machine command codes and executes commands, a garbage collector which manages memory spaces of objects and collects objects unused, a class loader which loads classes, an application manager which processes execution and end of at least one application, a per-application thread manager which divides and manages threads by the at least one application, and a per-application resource manager which divides and manages resources used to process the execution and end by the at least one application.

BRIEF DESCRIPTION OF THE DRAWINGS

The above and other aspects of the present invention will become more apparent by describing in detail exemplary embodiments thereof with reference to the attached drawings, in which.

Figure 1:
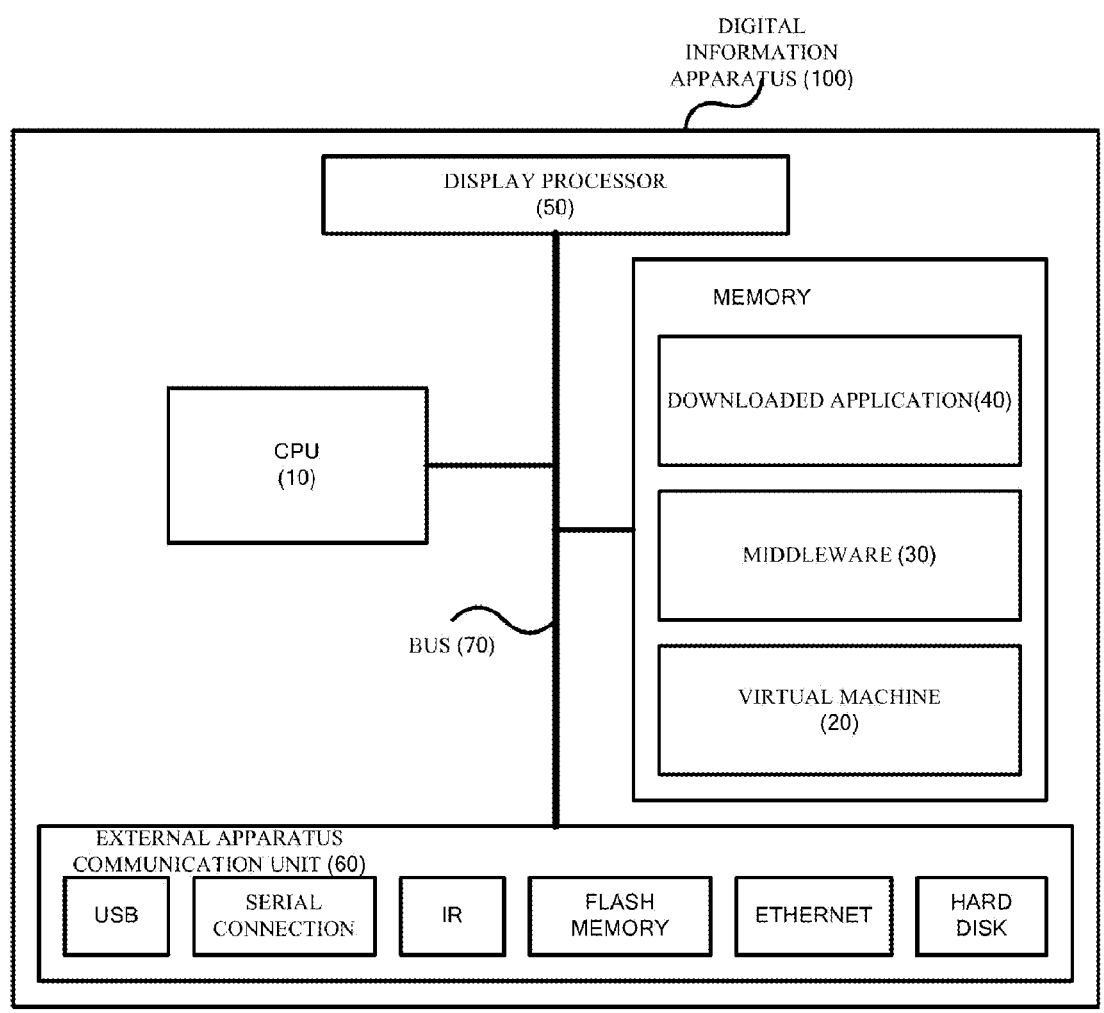
FIG. 1 is a diagram showing the configuration of a digital information apparatus including a virtual machine according to the related art.

DESCRIPTION OF THE EXEMPLARY
EMBODIMENTS OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, a method of providing a partially-isolated execution environment for multiple applications and a digital information apparatus using the same according to exemplary embodiments of the invention will be described with reference to block diagrams or flowcharts.

Figure 6:
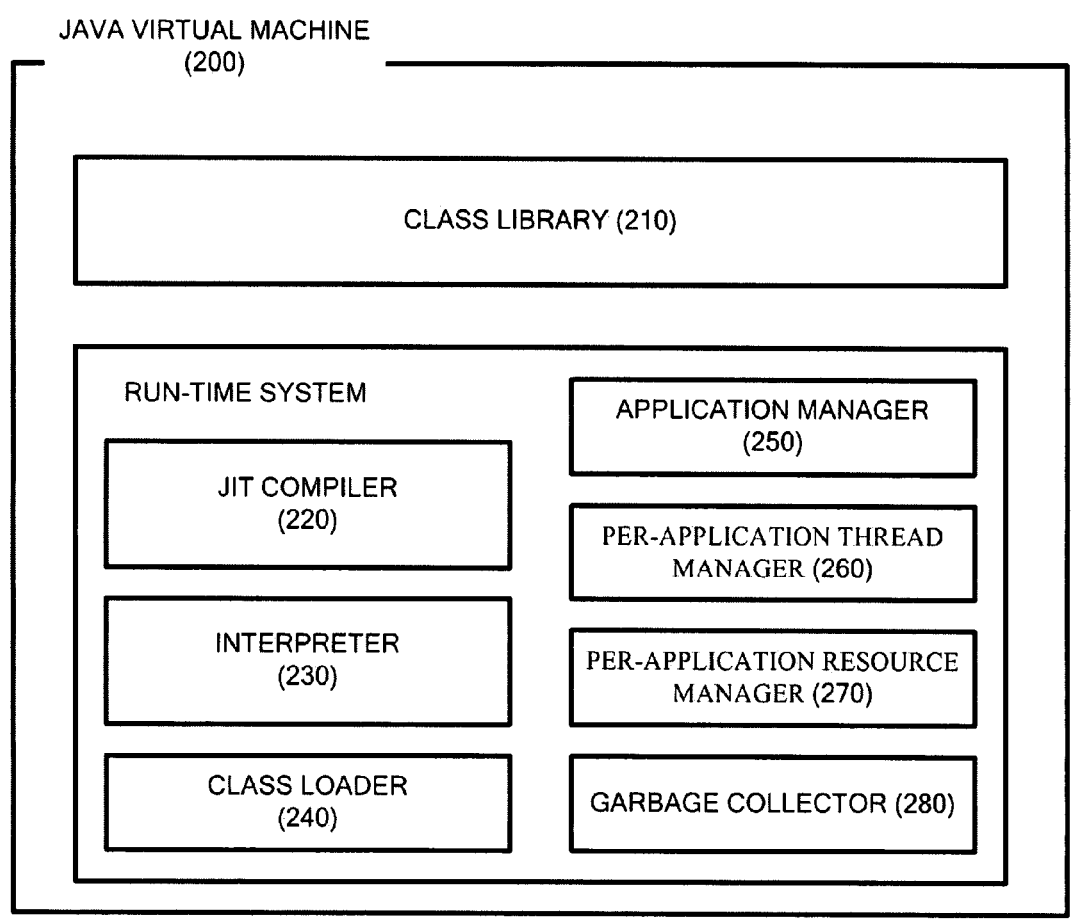
FIG. 6 is a diagram showing the configuration of a Java virtual machine according to an exemplary embodiment of the invention.

FIG. 6 is a diagram showing the configuration of a Java virtual machine according to an exemplary embodiment of the invention. Referring to FIG. 6, a Java virtual machine 200 has a class library 210 and a run-time system. The run-time system includes a JIT compiler 220, an interpreter 230, a class loader 240, an application manager 250, a per-application thread manager 260, a per-application resource manager 270, and a garbage collector 280.

The digital information apparatus used herein includes all apparatuses that can drive software by a CPU, such as a general-use Personal Computer (PC), a Personal Digital Assistant (PDA), a cellular phone, a digital TV, a digital set-top box, and the like. For convenience of explanation, the virtual machine will be described by way of the Java virtual machine, but the scope of the invention is not limited to a specified virtual machine.

Figure 2:
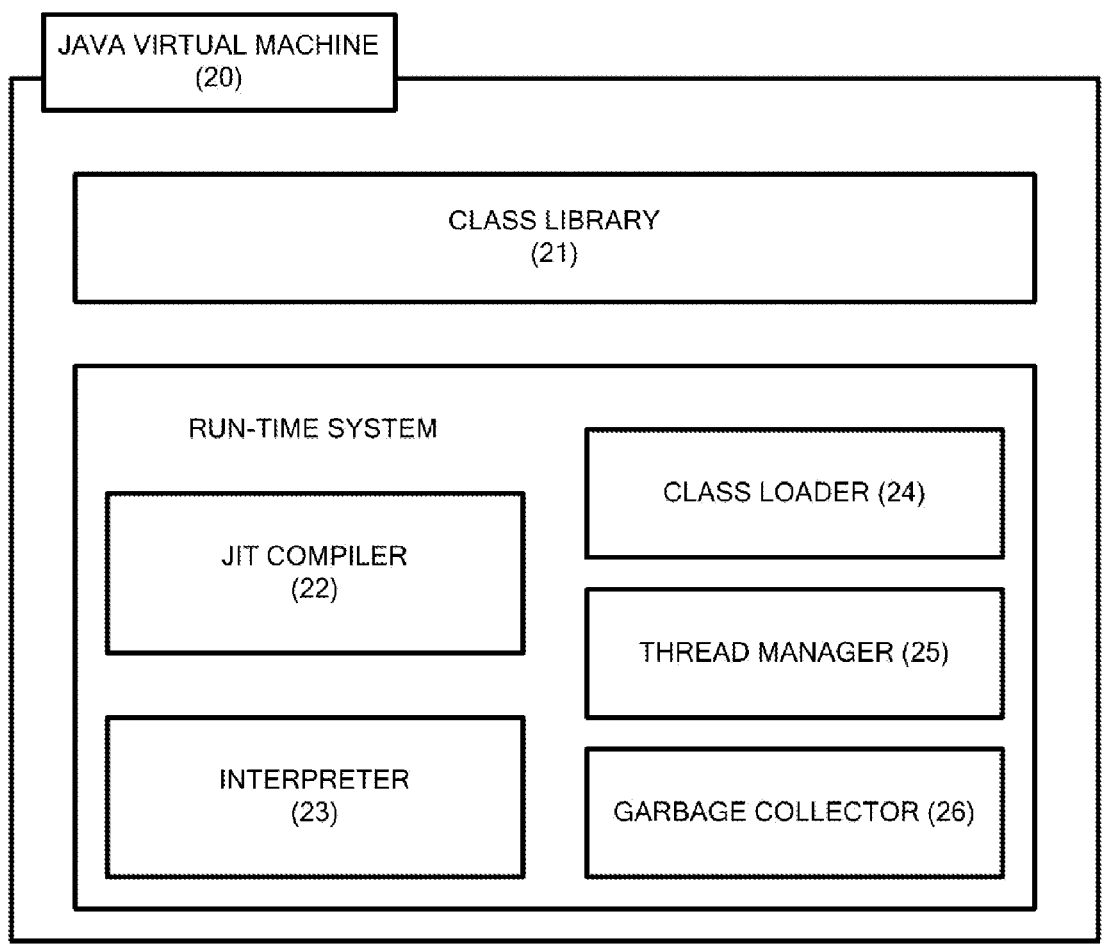
FIG. 2 is a diagram showing the configuration of a Java virtual machine according to the related art.
Figure 3:
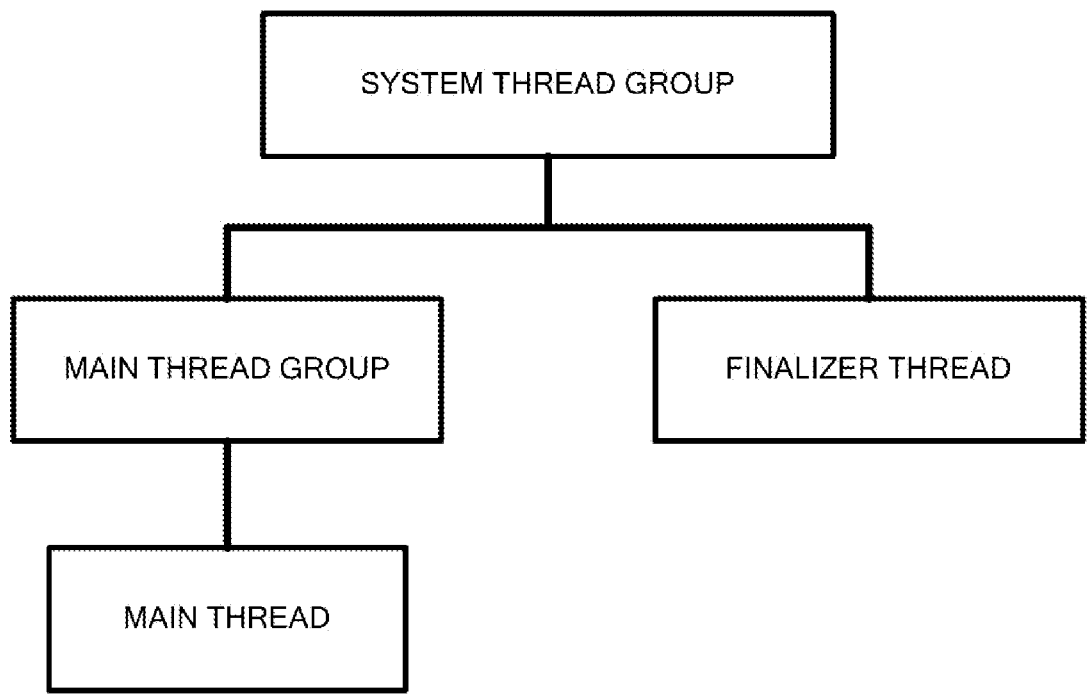
FIG. 3 is a diagram showing the correlation of thread groups and threads in the Java virtual machine shown in FIG. 2.

When compared with one shown in FIG. 2, in the Java virtual machine 200 shown in FIG. 6, the thread manager 25 is replaced with the per-application thread manager 260, and the application manager 250 and the per-application resource manager 270 are added. Other constituent elements are the same as those in the related art Java virtual machine shown in FIG. 2.

The application manager 250 processes the execution and end of at least one application.

The per-application thread manager 260 provides a method of dividing and managing threads by applications, unlike the related art. In the related art, all threads to be executed in one virtual machine are merely divided by thread groups to which the threads belong to, and are regarded as threads belonging to one OS process. Meanwhile, in the exemplary embodiment of the invention, even threads belonging to one OS process are divided according to which threads are generated during the execution of which application. As for the method of dividing threads by applications, there are various exemplary embodiments. In an exemplary embodiment of the invention, a representative class representative of an execution environment of each application (for example, a class called AppExecEnv) may be provided in the class library 210 of the virtual machine 200. One object of the representative class represents an execution environment for one application and the application is associated with the object of the representative class when any thread is generated. As such, there are many methods of dividing and managing threads by applications. The exemplary embodiment of the invention is not limited to a specified implementation method but includes methods of separately managing generated threads by the applications.

Figure 7:
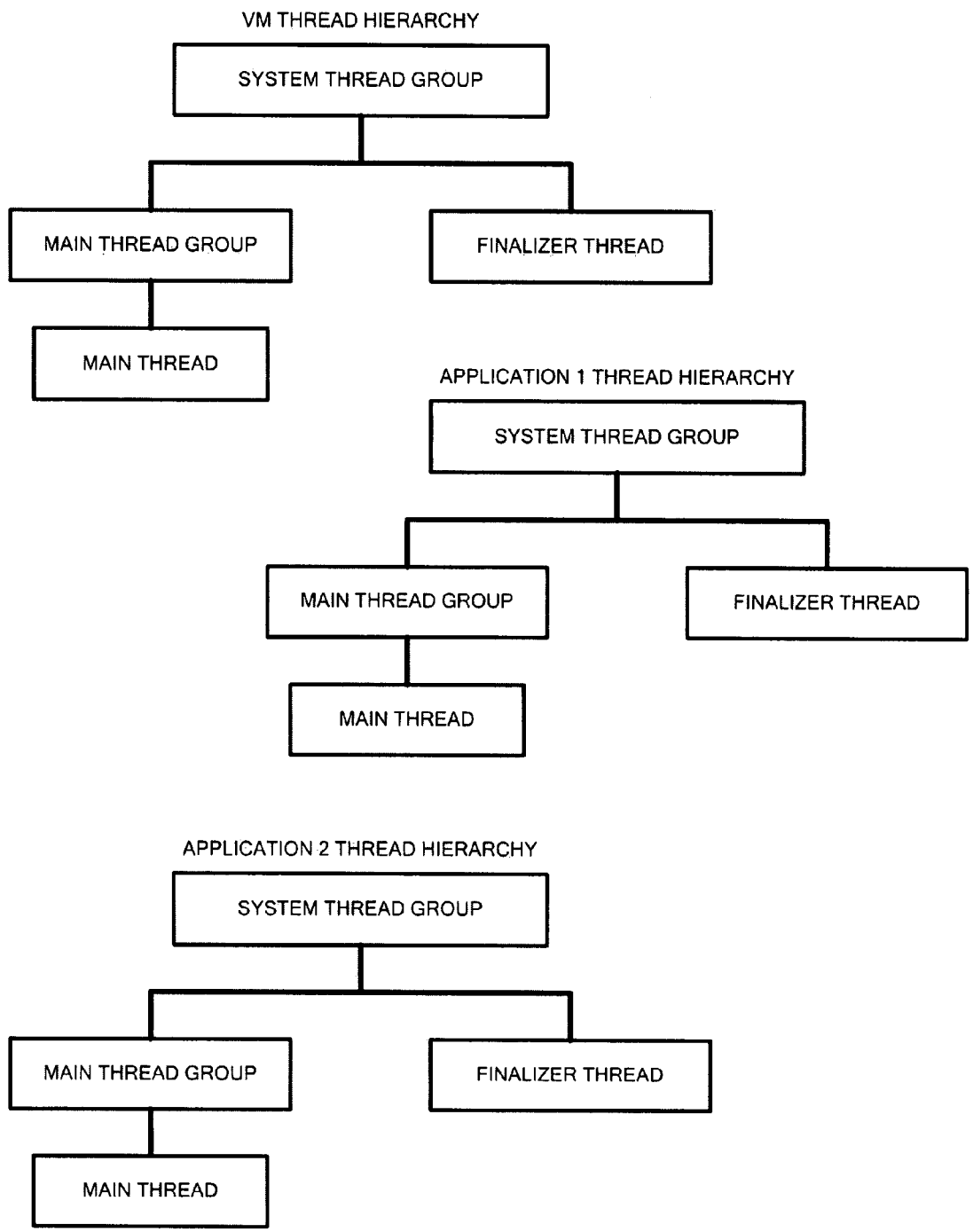
FIG. 7 is a diagram showing the correlation of thread groups and threads in the Java virtual machine shown in FIG. 6 and the correlation of thread groups and threads generated by applications.

FIG. 7 is a diagram showing the correlation of thread groups and threads in the Java virtual machine shown in FIG. 6 and the correlation of thread groups and threads generated by the applications. As can be seen from FIG. 7, threads generated when the basic Java virtual machine is driven have the same structure as those in the related art. However, threads generated when each application is driven are generated in a shape having a separate thread structure of the virtual structure for each application, unlike the related art. Referring to FIG. 7, applications 1 and 2 have system thread groups and main thread groups, respectively, and a finalizer thread and a main thread exist by the applications. That is, the per-application thread manager 260 manages the system thread group for each application, the main thread group and the finalizer thread constituting the system thread group, and the main thread constituting the main thread group.

Returning to FIG. 6, the per-application resource manager 270 divides and manages resources used to process the execution and end of at least one application by the applications. The per-application resource manager 270 may include a file manager (not shown) that controls input/output of files used in the applications, and a socket manager (not shown) that controls input/output of sockets.

Next, in an individual application, a job for cleaning-up resources used by the application while the main method of its main class ends or is forcibly ending by the middleware is required. The per-application resource manager 270 performs this job.

Further, the per-application resource manager 270 performs the following processing when an object list to be finalized managed by the finalizer thread of the application is not empty. That is, objects belonging to a system class in the object list to be finalized managed by the finalizer thread of the application (all shared classes that are not loaded by a per-application class loader and include basic classes of the virtual machine and classes of the middleware) are moved to an object list to be finalized managed by the finalizer thread of the system, all resources used by the applications are cleaned up, and then the object list to be finalized is cleaned up. This is to prevent a case where the resources of the system class are not cleaned up. The details thereof will be described below through the description of FIG. 10.

In the exemplary embodiment of the present invention, the term "unit", that is, "module" or "table", represents software and hardware constituent elements, such as a Field Programmable Gate Array (FPGA), or an Application Specific Integrated Circuit (ASIC). The module serves to perform some functions but is not limited to software or hardware. The module may reside in an addressable memory. Alternatively, the module may be provided to reproduce one or more processors. Therefore, examples of the module include elements such as software elements, object-oriented software elements, class elements, and task elements, processes, functions, attributes, procedures, subroutines, segments of program code, drivers, firmware, microcode, circuits, data, databases, data structures, tables, arrays, and parameters. The elements and the modules may be combined with other elements and modules or divided into additional elements and modules. In addition, the elements and the modules may be provided to reproduce one or more CPUs in a device or a security multimedia card.

Figure 4:
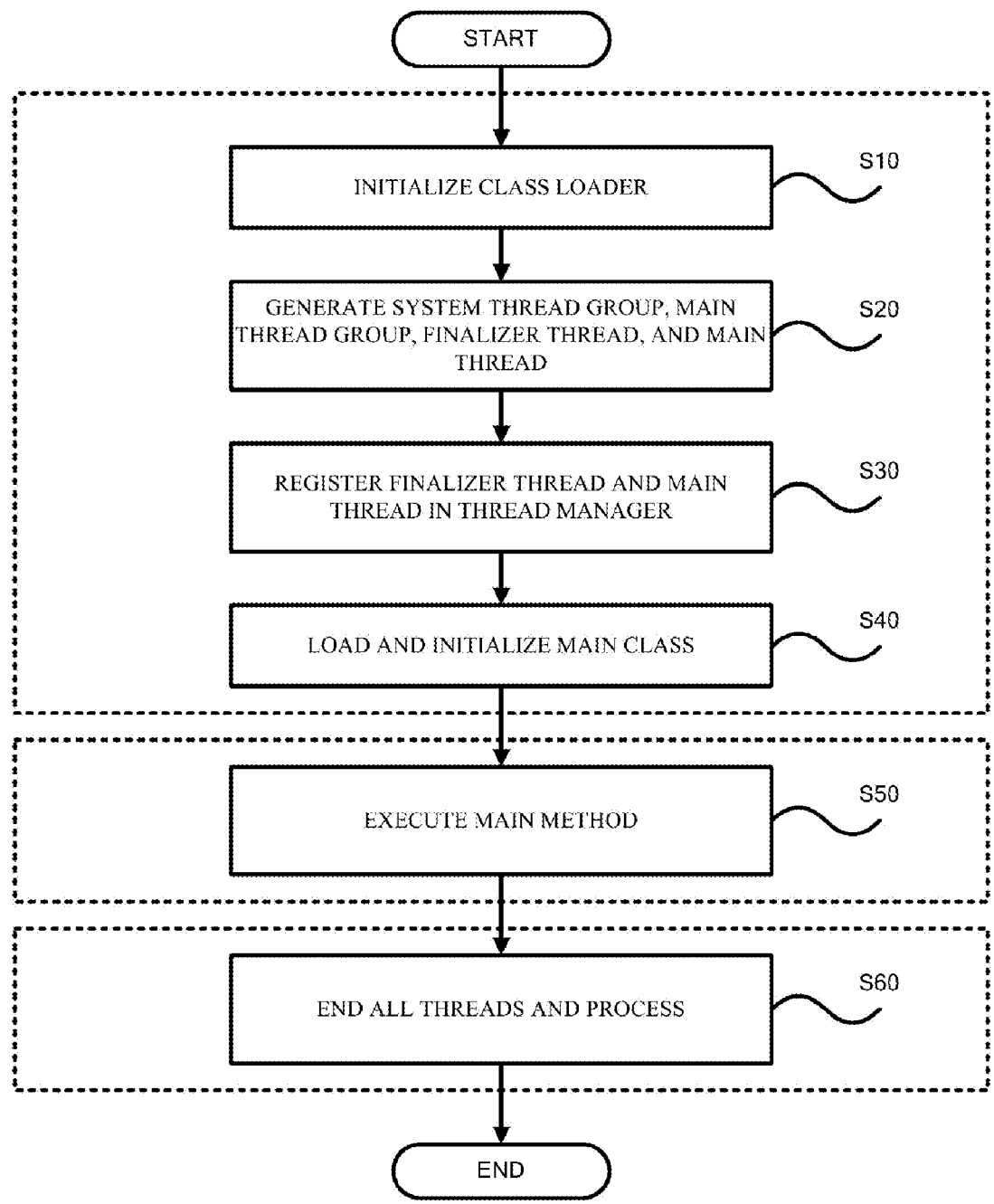
FIG. 4 is a diagram showing a flow of an execution process of the Java virtual machine according to the related art.
Figure 8:
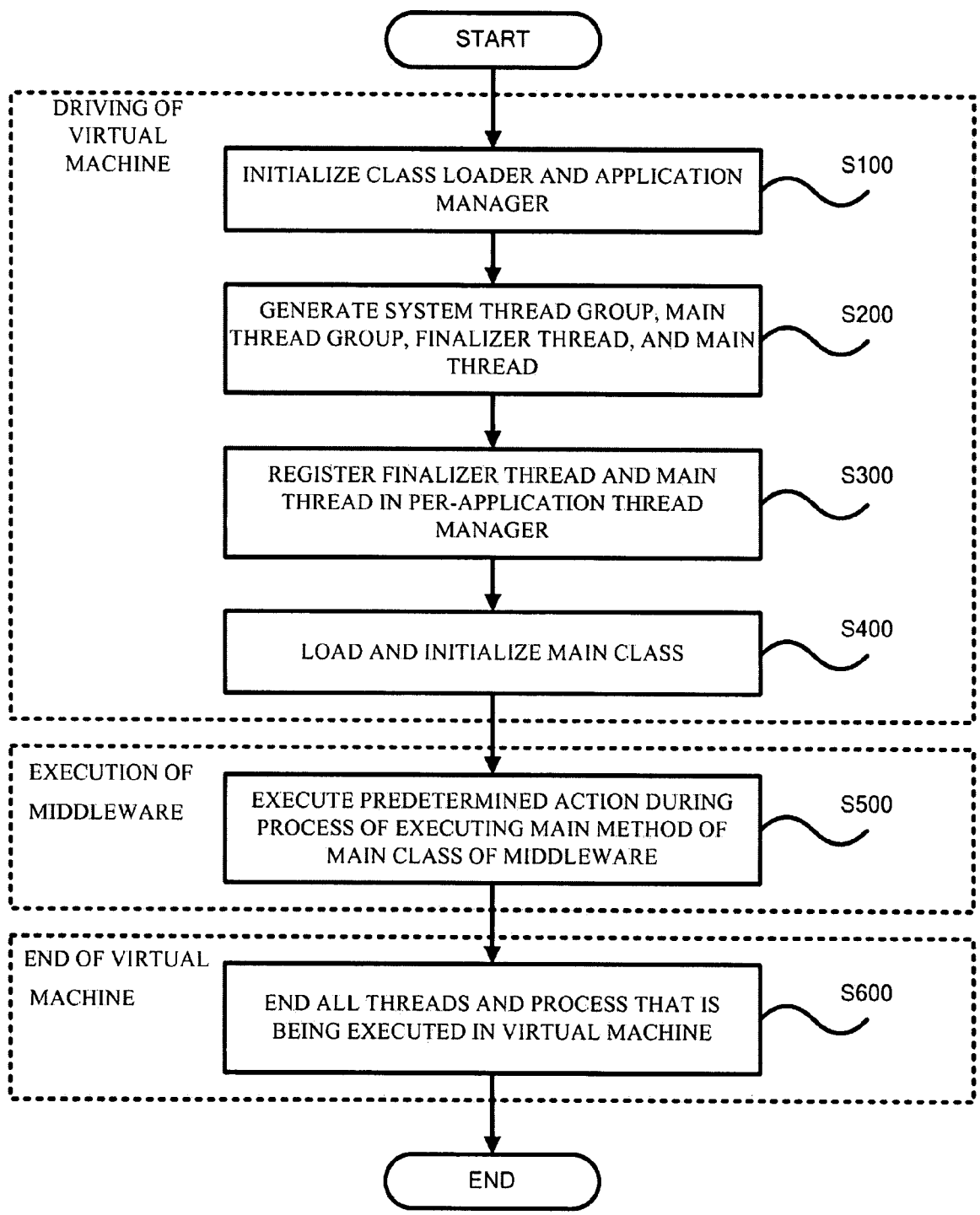
FIG. 8 is a diagram showing a flow of an execution process of the Java virtual machine according to an exemplary embodiment of the invention.

FIG. 8 is a diagram showing a flow of an execution process of the Java virtual machine according to an exemplary embodiment of the invention. This flow is basically the same process as that in FIG. 4. When compared with FIG. 4, there is a difference in that the per-application thread manager 260 newly added is used in order to register the threads. In particular, a thread structure generated when the Java virtual machine 200 is driven is registered as threads of a system belonging to any application and is separately managed from different applications. In an exemplary embodiment, an object of a representative class representing a system execution environment (for example, an AppExecEnv class) is generated, and the threads are associated with this object.

Referring to FIG. 8, first, when the Java virtual machine 200 is driven, the basic global data structure is initialized, and the class loader 240 and the application manager 250 are initialized (operation S100). That is, operation S100 may be regarded as an operation of generating a representative application object with a virtual machine itself as one system application. Next, the system thread group is generated, and the finalizer thread to be included therein is generated. Then, the main thread group is generated, and the main thread to be included therein is generated (operation S200). At this time, the generated finalizer thread and main thread are registered in the per-application thread manager 260 to be then managed (operation S300). Next, the main class of the middleware is loaded and initialized (operation S400). Here, a method of loading a main class is assigned as parameters when the virtual machine is driven.

If the main class is loaded, the main method is executed. A class including start codes of the middleware that resides in the memory corresponds to the main class. Then, the middleware starts to be driven from the main method defined herein, and the main method is executed by the applications (operation S500). This operation will be described below with reference to FIG. 9. After the main method ends, an operation of ending the virtual machine is executed. At the ending operation, all threads that are being currently executed end, and a process that is being executing in the virtual machine ends (operation S600).

Figure 5:
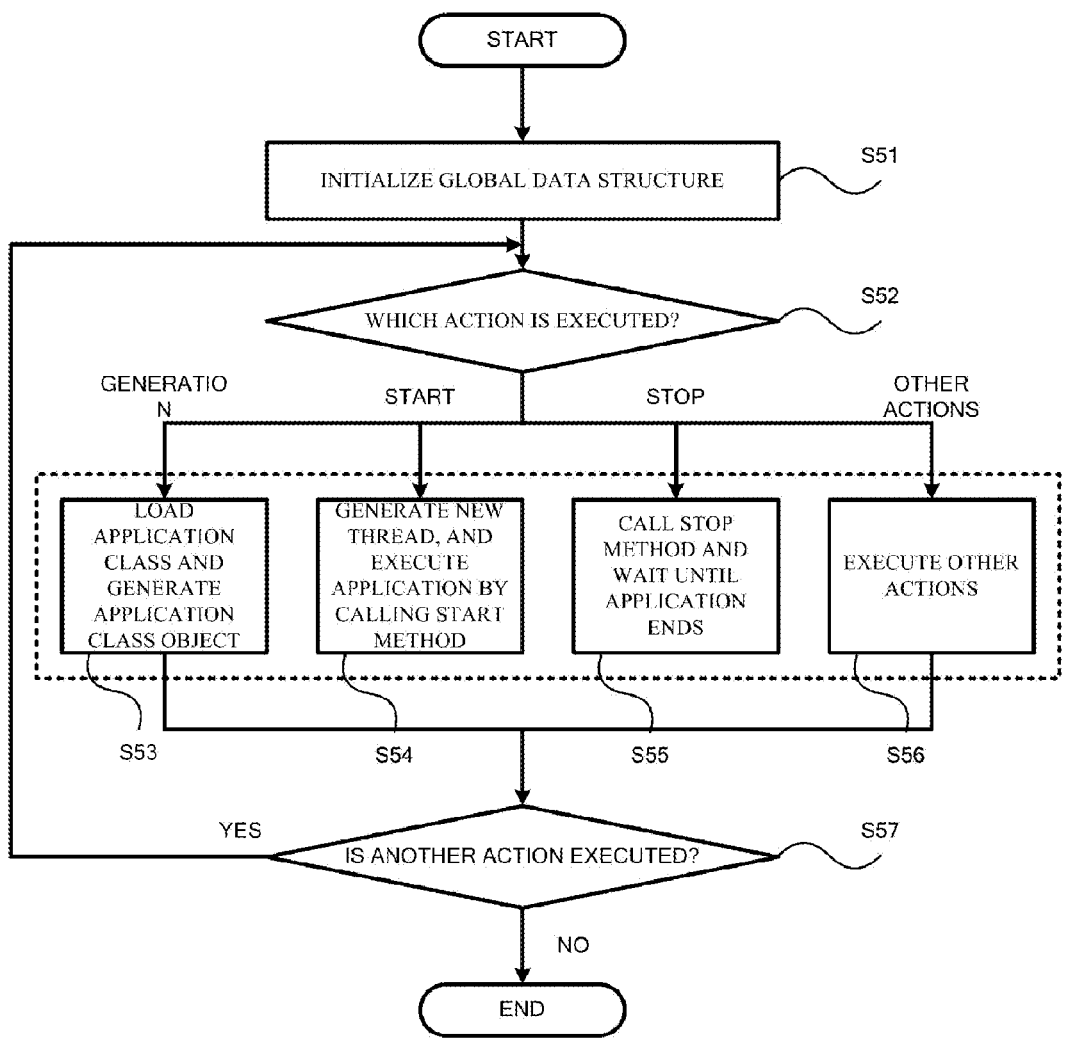
FIG. 5 is a diagram showing a flow of an execution process of middleware according to the related art.
Figure 9:
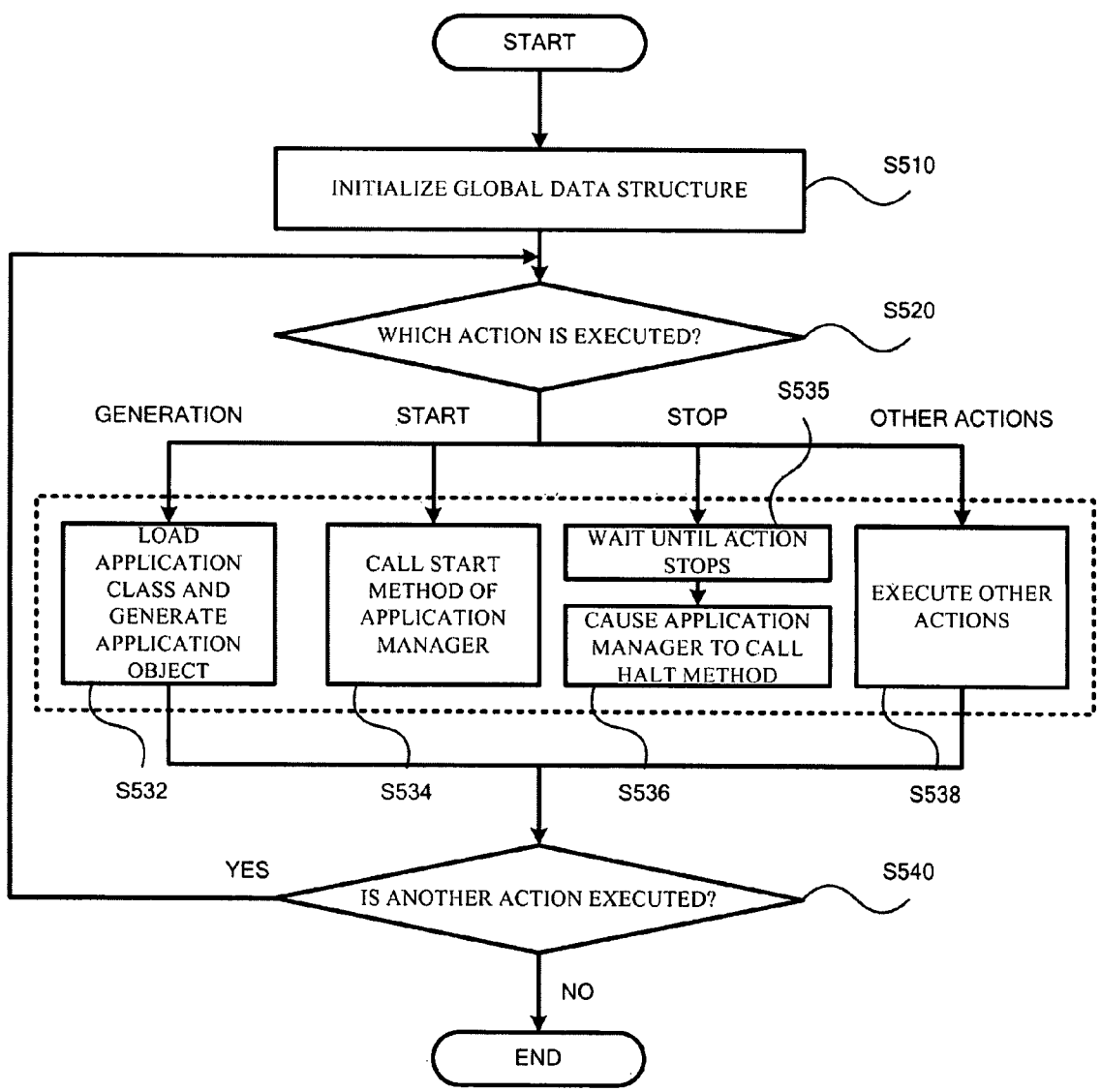
FIG. 9 is a diagram showing a flow of an execution process of middleware according to an exemplary embodiment of the invention.

FIG. 9 is a diagram showing a flow of an execution process of the middleware according to the exemplary embodiment of the invention. Referring to FIG. 9, upon the start of the middleware, the basic data structures are initialized (operation S510), and which action is to be executed is judged (operation S520). When a new application needs to be loaded, the objects of the application are generated with the classes of the application as parameters (operation S532). When the application needs to start, the codes of the application are not directly executed, and the start method of the application manager 250 is called so as to cause the application to be driven in a separate execution environment for the application (operation S534). This is because all of the initialization operations for the start of the application are performed by the application manager 250. Operation S534 will be described below in detail with reference to FIG. 10. Further, when the stop is required during the execution of the application, like the related art, a method for stopping the application is called. An operation (operation S535) of waiting until the application is in the ending state is the same as that of FIG. 5. In this exemplary embodiment, an operation (operation S536) of generating a separate thread and forcibly ending all threads belonging to the application by calling the halt method of the application manager 250 is newly added. At this operation, an existing method of ending the threads may be used together. After the threads end, an operation of cleaning-up resources is added, and then an operation of collectively releasing the resources is executed. Accordingly, it is possible to cope with a case where the application does not react on the stop method or the cleanup of the resources is not completed. When other actions are required, other actions are executed (operation S538).

Various actions described above are repeatedly executed. It is judged whether or not another action is executed (operation S540) and, when another action is executed, the process returns to operation S520. Then, the above-described operations are repeatedly executed, and thus an environment in which multiple different applications are executed simultaneously and stably is provided.

Figure 10:
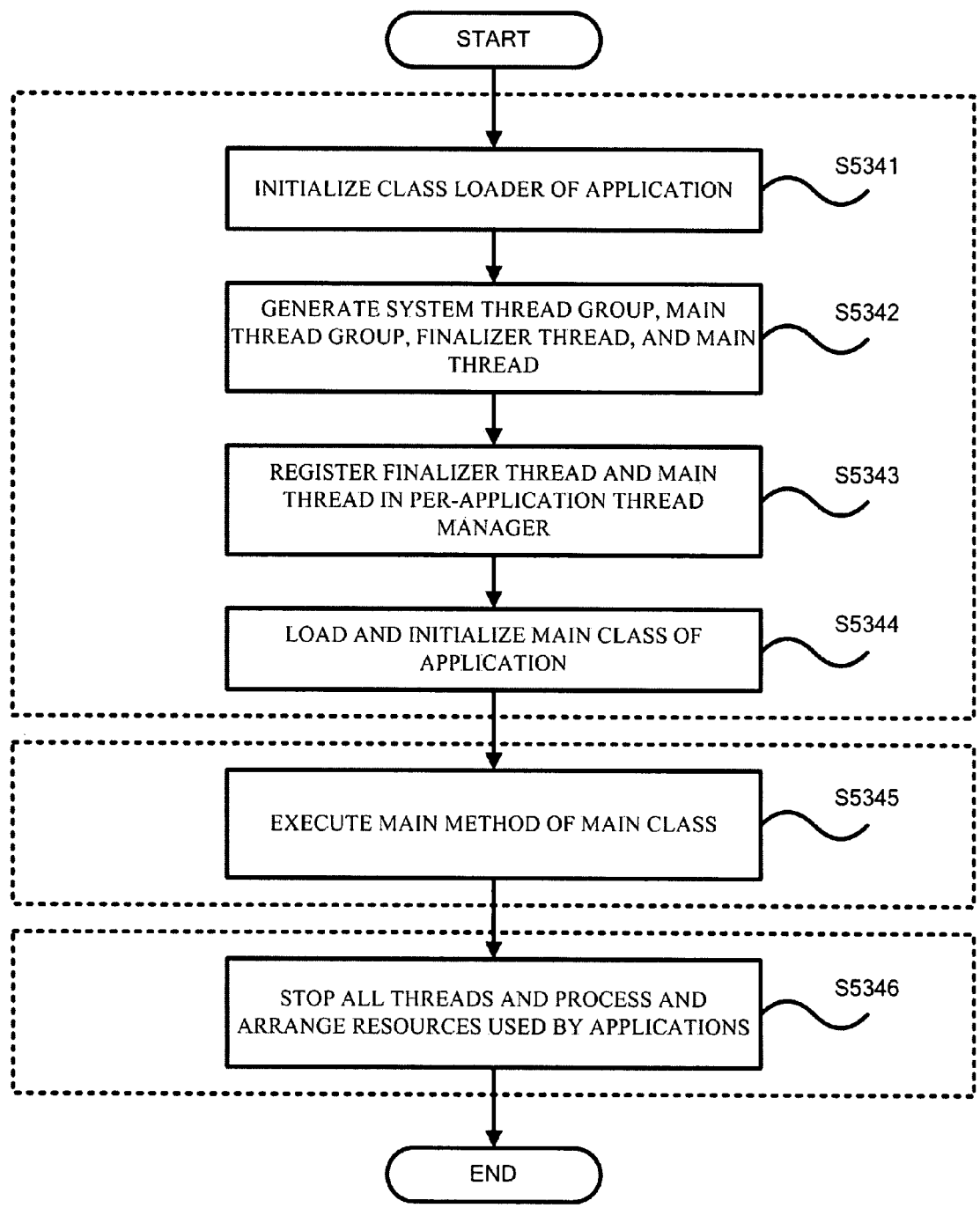
FIG. 10 is a diagram showing a call process of an application start method according to an exemplary embodiment of the invention.

Operation S534 will be described in detail with reference to FIG. 10. FIG. 10 is a diagram showing a process of calling the start method of the application according to an exemplary embodiment of the invention. The process shown in FIG. 10 is executed in the same manner as when one virtual machine is driven, and passes through operations similar to those shown in FIG. 8. Differences between the process of FIG. 10 and the process of FIG. 8 are as follows. First, the threads are managed as the threads belonging to the application, not the threads belonging to the system. Second, the class corresponding to the main class of the application is a class for driving the application assigned by the parameters at the operation (operation S532) of loading the application shown in FIG. 9. Third, while the main method of the main class of the application is ending, an operation of cleaning-up the resources used the application is added. That is, the per-application resource manager 270 manages the resources acquired during the execution of the application and collectively cleans up the resources at the above-described operation.

A simple description of FIG. 10 will be given. First, when the Java virtual machine 200 is driven, the basic global data structures are initialized, and then the class loader of the application is initialized (operation S5341). Next, the system thread group and the finalizer thread to be included therein are generated. Further, the main thread group and the main thread to be included therein are generated (operation S5342). At this time, the generated finalizer thread and main thread are registered in the per-application thread manager 260 (operation S5343) to be then managed. Next, the main class of the application is loaded and initialized (operation S5344). If the main class is loaded, the main method is executed. Then, the application starts to be driven from the main method defined herein, and the main method is executed by the applications (operation S5345). After the main method ends, the operation of ending the application is executed. At the ending operation, an operation (operation S5346) of stopping all threads that are being currently managed by the applications, and cleaning-up the resources used by the applications is newly added.

The operation of collectively releasing the resources will be described in detail. In this operation, first, the objects belonging to the system class in the object list to be finalized managed by the finalizer thread of the application are moved to the object list to be finalized managed by the finalizer thread of the system. Specifically, since the finalizer thread generated by the applications is also a thread belonging to the application and ends during the end of the thread, unended objects remain. Among these, classes basically provided by the virtual machine or objects of the class loaded by the system, such as a class given upon the driving of the virtual machine are not cleaned up yet. For this reason, the objects are moved to the object list to be finalized managed by the finalizer thread of the system. Subsequently, the resources used by the applications are collectively cleaned up, and then the unused objects are cleaned up using the garbage collector 280. Through the above-described operations, all threads generated by one application and all resources used by them are collectively cleaned up, such that the resources can be reused in the virtual machine. Here, the object list to be finalized will include files and sockets used in the application but unended.

It will be apparent to those skilled in the art that the scope of the method of providing a partially isolated execution environment for multiple applications and the digital information apparatus using the same according to an exemplary embodiment of the invention also includes a computer-readable recording medium having recorded thereon program codes for allowing the above-described method to be executed by a computer.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects. The scope of the present invention is defined by the appended claims rather than by the description preceding them, and all changes and modifications that fall within meets and bounds of the claims, or equivalences of such meets and bounds are therefore intended to be embraced by the claims.

According to the exemplary embodiment of the invention, the following effects can be obtained.

Since the threads and resources are separately managed by the applications, the threads and resources can be collectively cleaned up upon the end of the application. Accordingly, in a virtual machine to be executed in one OS process, even though multiple applications are executed in the same process, sharing of the resources can be efficiently performed, and unnecessary threads and resources do not remain after the end of the application. In particular, unlike the related art application isolation method, one garbage collector is basically used, and thus objects that need to be cleaned up can be cleaned up by the per-application resource manager while sharing of the objects can be allowed, such that unnecessary objects do not remain. As a result, the shared objects can be automatically managed by the per-application resource manager.

Further, since a simple class is provided such that the correction of related art middleware is minimized, even though the object management method of middleware is not completely changed, the object sharing function provided by the related art virtual machine can be used as it is. Therefore, the invention can be easily implemented, and in particular, multiple applications can be safely executed without correcting the related art application.

The effects of the invention are not limited to those mentioned above, and other effects will be apparently understood by those skilled in the art through the appended claims.

What is claimed is:

1. A method of providing a partially-isolated execution environment for multiple applications in a digital information apparatus comprising a virtual machine and middleware, the method comprising:

initializing an application manager by executing the virtual machine, and loading and initializing a main class of the middleware;

executing an action for each application through a method of the application manager while executing a main method of the main class of the middleware; and finalizing all threads and ending a process during execution in the virtual machine, wherein the executing of the action comprises executing the action by generating a thread structure on a per-application basis and associating the thread structure with an object of a representative class that represents a system execution environment, the object of the representative class being generated on a per-application basis, and wherein a finalizer thread, of the generated thread structure, is registered on a per-application basis.

2. The method of claim 1, wherein the initializing of the application manager and the loading and the initializing of the main class of the middleware comprises:

initializing the application manager by generating a representative application object with the virtual machine as one system application;

generating a system thread group for a system, a main thread group and the finalizer thread constituting the system thread group, and a main thread constituting the main thread group;

registering the finalizer thread and the main thread in a per-application thread manager; and loading and initializing the main class of the middleware.

3. The method of claim 1, wherein the executing of the action by generating the thread structure on the per-application basis comprises:

causing the middleware to load a new application;

generating the thread structure by the loaded application through a start method of the application manager; and ending the thread structure by the application through a halt method of the application manager.

4. The method of claim 3, wherein the generating of the thread structure by the loaded application comprises:

loading and initializing a main class of the application;

executing a main method of the main class of the application; and after the executing of the main method is completed, executing a cleanup of resources used by the application.

5. The method of claim 4, wherein the loading and initializing of the main class of the application comprises:

generating a system thread group of the application, a main thread group and the finalizer thread constituting the system thread group, and a main thread constituting the main thread group;

registering the system thread group, the main thread group, the finalizer thread, and the main thread, on a per-application basis, in a per-application thread manager; and loading and initializing the main class of the application.

6. The method of claim 3, wherein the ending of the thread structure comprises:

ending the thread structure by the application through the halt method of the application manager; and executing a cleanup of resources used by the application.

7. The method of claim 4, wherein the executing of the cleanup comprises:

moving objects belonging to a system class in an object list to be finalized managed by the finalizer thread of the application to an object list to be finalized managed by a finalizer thread of a system; and cleaning up all resources used by the application and the object list to be finalized managed by the finalizer thread of the application.

8. The method of claim 7, wherein the resources used by the application comprise files and sockets that are used in the application but are not ended.

9. The method of claim 6, wherein the executing of the cleanup comprises:

moving objects belonging to a system class in an object list to be finalized managed by the finalizer thread of the application to an object list to be finalized managed by a finalizer thread of a system; and cleaning up all resources used by the application and the object list to be finalized managed by the finalizer thread of the application.

10. The method of claim 9, wherein the resources used by the application comprise files and sockets that are used in the application but are not ended.

11. A digital information apparatus on which a virtual machine is mounted, the apparatus comprising:

an interpreter which analyzes virtual machine command codes and executes commands;

a garbage collector which manages memory spaces of objects and collects objects unused;

a class loader which loads classes;

an application manager which processes execution and end of at least one application;

a per-application thread manager which divides and manages threads by the at least one application; and a per-application resource manager which divides and manages resources used to process the execution and end by the at least one application, wherein the per-application thread manager generates a thread structure on a per-application basis and associates the thread structure with an object of a representative class that represents a system execution environment, the object of the representative class being generated on a per-application basis, and wherein at least one of the interpreter, the garbage collector, the class loader, the application manager, the per-application thread manager, and the per-application resource manager is implemented as a hardware component, and wherein a finalizer thread, of the generated thread structure, is registered on a per-application basis.

12. The digital information apparatus of claim 11, wherein the per-application thread manager manages a system thread group for the at least one application, a main thread group and the finalizer thread constituting the system thread group, a main thread constituting the main thread group, and threads and thread groups derived from the thread groups and the threads.

13. The digital information apparatus of claim 11, wherein the per-application resource manager comprises:

a file manager which controls input/output of files to be used in the at least one application; and a socket manager which controls input/output of sockets to be used in the at least one application.

14. The digital information apparatus of claim 11, wherein the per-application resource manager moves objects belonging to a system class in an object list to be finalized managed by the finalizer thread of the at least one application to an object list to be finalized managed by a finalizer thread of a system.

15. The digital information apparatus of claim 11, wherein the virtual machine is a Java virtual machine.

* * * * *